United States Patent
Palumbo et al.

(10) Patent No.: US 8,959,640 B2
(45) Date of Patent: Feb. 17, 2015

(54) CONTROLLING ANTI-VIRUS SOFTWARE UPDATES

(75) Inventors: Paolo Palumbo, Helsinki (FI); Andrew Patel, Helsinki (FI)

(73) Assignee: F-Secure Corporation, Helsinki (FI)

( * ) Notice: Subject to any disclaimer, the term of this patent is extended or adjusted under 35 U.S.C. 154(b) by 147 days.

(21) Appl. No.: 13/434,002

(22) Filed: Mar. 29, 2012

(65) Prior Publication Data

US 2013/0263269 A1    Oct. 3, 2013

(51) Int. Cl.
    *H04L 29/06*        (2006.01)
(52) U.S. Cl.
    USPC ............... 726/24; 726/22; 726/23; 726/25; 713/187; 713/188; 713/192; 713/193
(58) Field of Classification Search
    CPC ......... H04L 63/14; G06G 21/55; G06F 21/56
    USPC .............................. 726/22–25; 718/187–188; 713/187–188, 192–193
    See application file for complete search history.

(56) References Cited

U.S. PATENT DOCUMENTS

| 7,630,381 | B1 * | 12/2009 | Roskind et al. | 370/395.42 |
| 8,243,705 | B2 * | 8/2012 | Palm | 370/338 |
| 8,291,312 | B1 * | 10/2012 | Zhou | 715/234 |
| 2004/0187023 | A1 * | 9/2004 | Alagna et al. | 713/200 |
| 2008/0282336 | A1 * | 11/2008 | Cuellar et al. | 726/11 |
| 2009/0260055 | A1 * | 10/2009 | Parmar | 726/1 |
| 2009/0300761 | A1 * | 12/2009 | Park et al. | 726/23 |
| 2010/0262584 | A1 * | 10/2010 | Turbin et al. | 707/674 |

* cited by examiner

*Primary Examiner* — Josnel Jeudy
(74) *Attorney, Agent, or Firm* — Harrington & Smith

(57) ABSTRACT

The present invention relates to a method of controlling the download of anti-virus software updates to a device. The device is configured to transmit an update query to a network device requesting information on whether any updates are available for the anti-virus software. When the device receives the response it stores the response in the cache. The cache can then be queried following a trigger and, if the cache indicates an update to the anti-virus software is available the device downloads an update to the anti-virus software. In an alternative embodiment the device may download and install an update upon receiving the response to the query if the response to the query indicates that an update is available. The query may be transmitted during a scan or upon determining a change in a connection at a device.

17 Claims, 5 Drawing Sheets

CONTROLLING ANTI-VIRUS SOFTWARE UPDATES

TECHNICAL FIELD

The present invention relates to a method for controlling updates to anti-virus software on a device. It relates in particular, although not necessarily, to the download of anti-virus software updates to mobile devices.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious and unwanted software. Any client device, such as a desktop personal computer (PC), laptop, tablet or mobile phone, can be at risk from malware.

When a device is infected by a malware program the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware. Furthermore, even if a malware infection does not cause a perceptible change in the performance of a device, it may be performing other malicious functions such as monitoring and stealing potentially valuable commercial, personal and/or financial information, or hijacking a device so that it may be exploited for some illegitimate purpose.

Many end users make use of anti-virus software to detect and possibly remove malware. In order to detect a malware file, the anti-virus software must have some way of identifying it amongst all the other files present on a device. Typically, this requires that the anti-virus software has access to a locally-stored database containing the "signatures" or "fingerprints" that are characteristic of individual malware program files. When the supplier of the anti-virus software identifies a new malware threat, the threat is analysed and its signature is generated. The malware is then "known" and its signature can be distributed to end users as updates to their local anti-virus software databases.

One example of a known method of updating locally-stored anti-virus software is shown in FIG. 1. As can be seen, software installed on device periodically transmits requests for an update over a network connection to a server. If an update is available on the server, it is immediately downloaded to the device and used by the device. This model of operation is able to keep all subscribing machines up to date with anti-virus updates.

This method of updating the anti-virus software necessarily uses a network connection. As the size of anti-virus databases has grown substantially over the years, a number of mechanisms have been employed to reduce the bandwidth needed for such updates in order to minimize costs. This reduction in update size has been handled by sending diffs (a file showing the difference between the updated file and the original file) rather than an entire copy of an updated file and using compression on the updates themselves.

The bandwidth of network connections to fixed points, such as a PC, has increased in recent years. However, anti-virus software solutions are also used on devices that may only utilize mobile broadband, which is still quite heavily limited. Mobile broadband is typically much slower than fixed broadband, and customers may have a small cap on monthly data usage. This means that the method of updating anti-virus software is still an important consideration.

SUMMARY

An aim of the present invention is to reduce the costs associated with updating software from anti-virus software provider's servers.

In accordance with a first aspect of the present invention there is provided a device comprising a memory including anti-virus software, an output configured to transmit an update query, an input to receive a response to the update query, the response indicating whether an update to the anti-virus software stored in the memory is available and a cache configured to cache the response to the query.

Optionally, the device may include a processor configured to determine meta-data for an object on the device, query the anti-virus software stored in the memory using the meta-data and, if the object is not known from the meta-data checking the cache to determine whether an update to the anti-virus software in the memory is available and, if an update is available, causing the device to download and install the update.

Alternatively, the processor may be configured to determine meta-data for an object on the device, an output to query a network device using the meta-data for the object and, upon receiving a response indicating that the object is not known by the network device, checking the cache to determine whether an update to the anti-virus software in the memory is available and, if an update is available, causing the device to download and install the update.

The device may transmit the update query at predetermined time intervals, the cache being configured to cache the last received response to the query.

The device may be configured to transmit the update query in response to one of an object being downloaded to the device, the device being switched on and receiving a user input.

In accordance with a second aspect of the present invention there is provided a method, in a device including anti-virus software, comprising: the device transmitting an update query to a second device, receiving, at the device, a response to the update query indicating whether an update to the anti-virus software is available, and caching the response to the query on the device.

In accordance with a third aspect of the present invention there is provided a computer program stored on a computer readable medium which, when executed on a device including anti-virus software causes the device to perform the steps of: transmitting an update query to a second device, and caching the response to the update query, the response to the update query indicating whether an update to the anti-virus software is available.

In accordance with a fourth aspect of the present invention there is provided a method of scanning an object on a device for malware comprising the steps of, following initiation of a scan on the object, querying a network device to determine whether an update to anti-virus software stored on the device is available and, if an update is available, downloading and installing the update on the device.

The scan of the object may optionally include the steps of determining meta-data for the object, querying a database to determine if the meta-data is known, the step of querying the network device being performed if the meta-data is not known.

The step of querying a database may optionally be querying a database of meta-data on the device or querying a database of meta-data on a network device remote from the device.

In accordance with a fifth aspect of the present invention there is provided a device comprising a memory including anti-virus software, a processor to scan an object on the device using the anti-virus software, an output configured to transmit an update query following initiation of the scan, an input to receive a response to the update query, the response indicating whether an update to the anti-virus software stored in the memory is available and an output to request an update to the anti-virus software if the response indicates that an update to the anti-virus software is available.

In accordance with a sixth aspect of the present invention there is provided a computer program stored on a computer readable medium which, when executed on a device including anti-virus software causes the device to: scan an object on the device using the anti-virus software, transmit an update query following initiation of the scan and, upon receiving a response to the update query indicating that an update to the anti-virus software is available, request an update to the anti-virus software if the response indicates that an update to the anti-virus software is available.

In accordance with a seventh aspect of the present invention there is provided a method of updating anti-virus software stored on a device, the device being configured to connect to a network comprising the steps of determining a change in a connection to the network at the device, in response to determining a change in the connection, determining if an update to the anti-virus software on the device is available, and downloading an update to the anti-virus software to the device over the connection if an update to the anti-virus software is available.

Optionally, following determining a change in a connection to the network, the method may include the steps of determining if the connection is a connection to the internet and wherein the step of downloading an update to the anti-virus software to the device occurs if an update to the anti-virus software is available and the connection is to the internet.

The method may include the further step of determining the speed of the connection and, if the speed is less than a predetermined threshold providing a prompt to the user of the device, wherein the step of downloading an update to the anti-virus software is dependent upon a response to the prompt.

The step of determining if an update to the anti-virus software on the device is available may include querying a cache on the device, the cache including an indication of whether an update is available. Alternatively, the step of determining if an update to the anti-virus software is available may include transmitting a query to a network device and receiving a response from the network device indicating whether an update to the anti-virus software is available.

In accordance with an eighth aspect of the present invention there is provided a device comprising a transceiver configured to connect to a network over a network connection, a memory including anti-virus software and a processor configured to detect a change in the network connection and in response determine whether an update to the anti-virus software is available, and transmit a request for an update to the anti-virus software if it is determined that an update to the anti-virus software is available.

In accordance with a ninth aspect of the present invention there is provided a computer program stored on a computer readable medium which, when executed on a device including anti-virus software causes the device to, upon determining a change in a network connection at the device, determine if an update to the anti-virus software is available and, if an update to the anti-virus software is available, cause the device to request an update to the anti-virus software.

DETAILED DESCRIPTION

Figure 1:
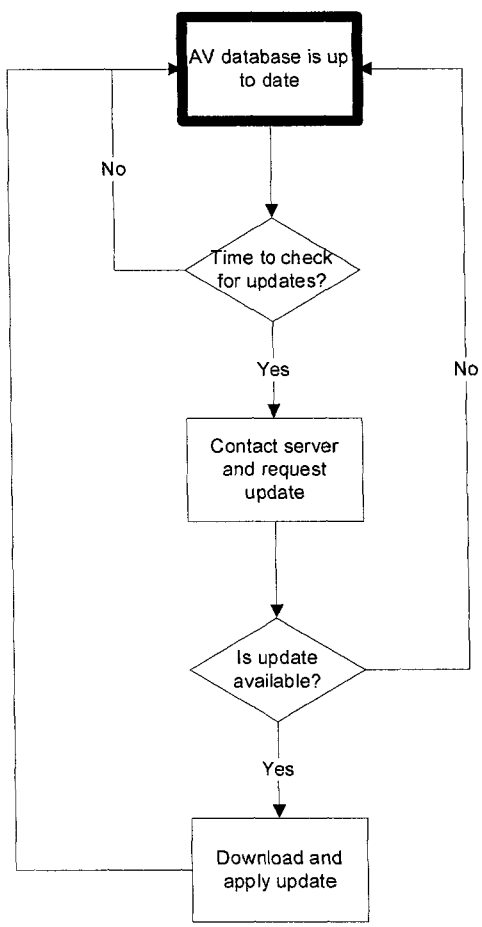
FIG. 1 is a flow diagram of a known method of scanning an object for malware.
Figure 2:
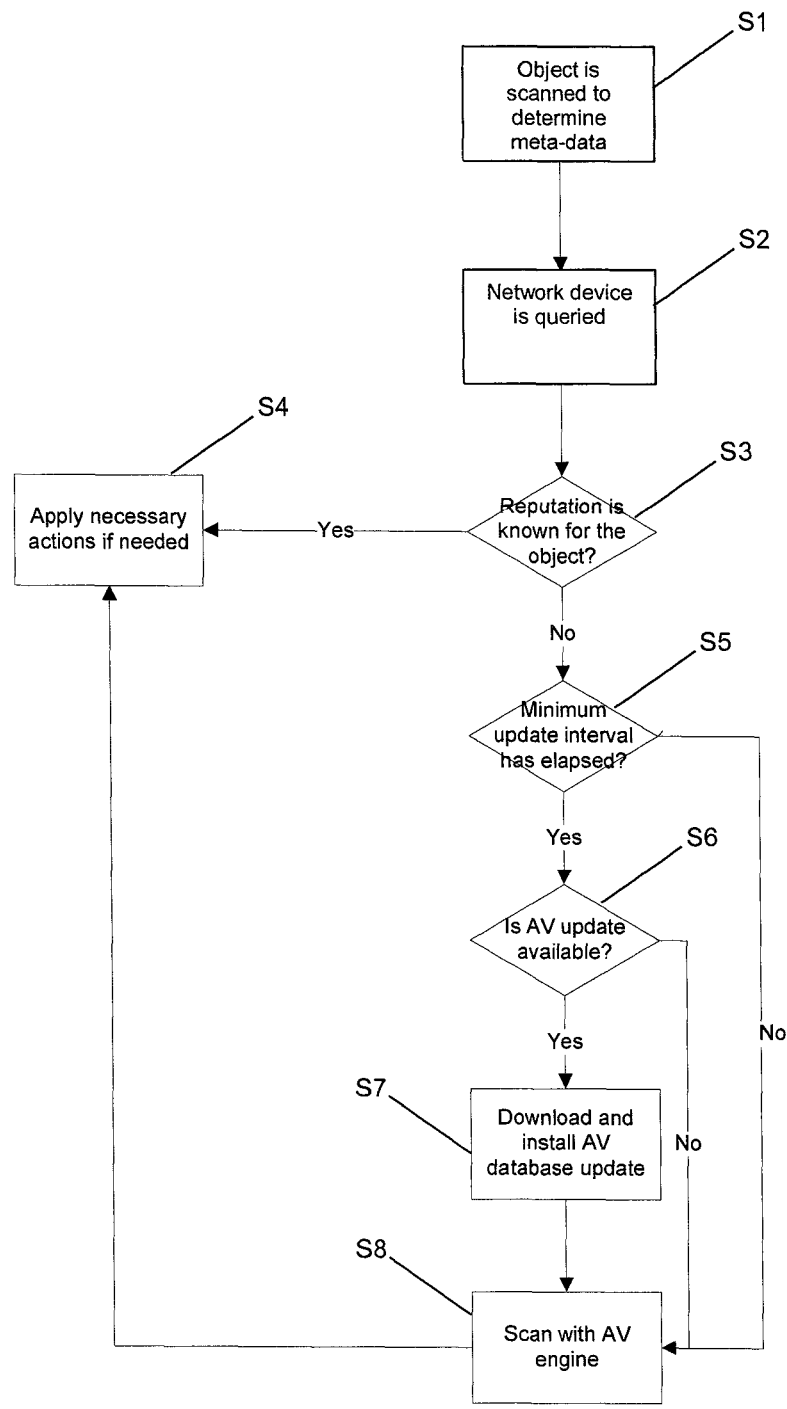
FIG. 2 is a flow diagram of a method of updating anti-virus software on a device according to an embodiment of the present invention.

A flow diagram of a method of an embodiment of the present invention is illustrated in FIG. 2. In response to a trigger, such as an object being downloaded to a device, or manual instigation, an object stored on the device is scanned to determine any meta-data associated with the object (Step S1). The meta-data may be, for example, a digital signature such as the SHA-1 hash or any other suitable identifying meta-data. In step S2 the device queries a network device using the meta-data derived from the scanned object. The network device may be, for example, a server in the cloud.

Figure 3:
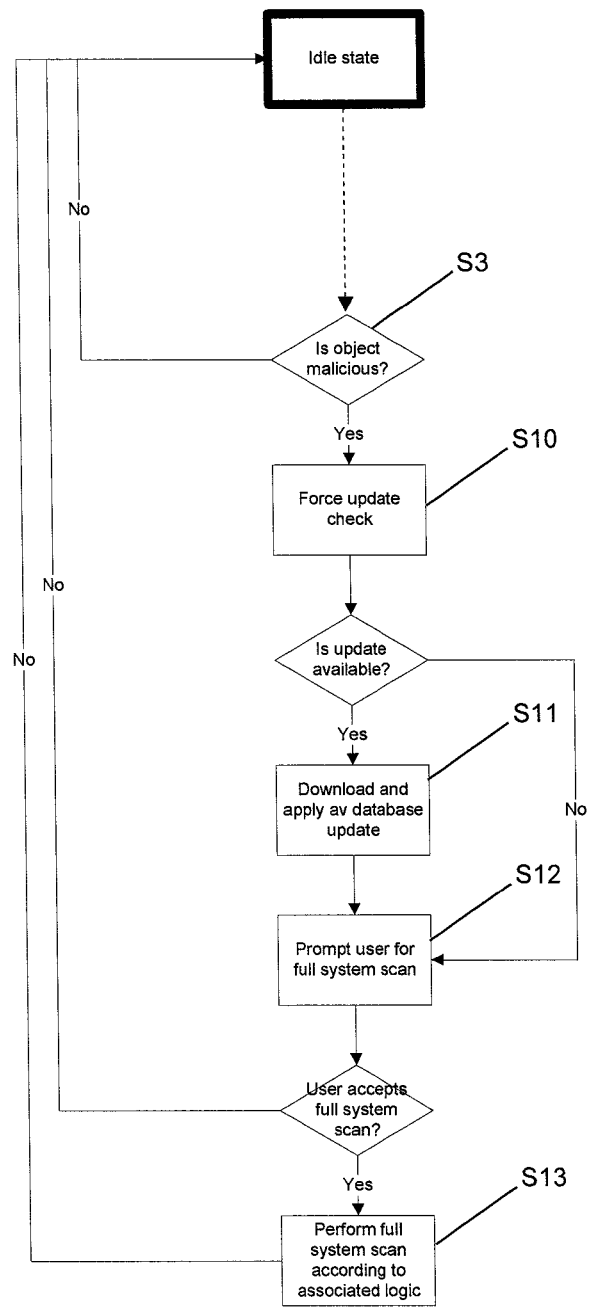
FIG. 3 is a flow diagram of a method of updating anti-virus software on a device when an object is found to be malicious.

In response to the query the network device sends a response message to the device. The response message indicates whether, according a database of meta-data stored on the network device the signature is known and the object is clean, the signature is known and the object is malicious or the signature is not known by the network device. If the signature is known then the device proceeds to step S4. In S4, if the object is known to be clean then the device need take no further action; however, if the device is known to be malicious then the steps described below with reference to FIG. 3 are carried out.

If the meta-data query yields the response that the object is not known by a network device then the device proceeds to perform steps S5 to S8. Thus, the device first determines whether a minimum time interval specified on the device has elapsed (Step S5). The minimum time interval is a period of time which must elapse between downloads of anti-virus database updates to the device.

If the minimum time interval has not elapsed then the device scans the object using the anti-virus database stored in the device's memory (Step S8).

If the minimum time interval has elapsed then the device transmits a query to a network device to determine whether an anti-virus software update is available (Step S6). If no update is available the device performs a scan of the object using the anti-virus database stored in the device's memory (Step S8).

If an update is available then the device downloads and installs the update (Step S7). The device then scans the object using the updated anti-virus database stored in the device's memory (Step S8).

In Step S8 the anti-virus software scans the object in usual way and determines either that the object is clean or malicious. If the object is clean then no further action need be taken with reference to the device. If the object is determined to be malicious then the device performs the appropriate steps to clean the device in accordance with the anti-virus software.

The embodiment described with reference to FIG. 2 assumes that the device has network connectivity. Although this is likely if the trigger to beginning a scan is downloading an object to the device it may not always be the case (for example if the trigger is user initiated).

In the event that the device does not have network connectivity, then in step S2 the device does not query a network device using meta-data but rather queries a database of meta-data stored in the device's memory to determine whether the object is a known object or not. Additionally, the device will perform a scan of the object using the locally stored version of the anti-virus software. Alternatively, in the event that the device does not have network connectivity the device may proceed directly to step S8 and not perform any of steps S2 to S7.

If a network device query using meta-data reveals that the object is a malicious object then the device may perform the method illustrated in FIG. 3. In FIG. 3 steps S1 and S2 are omitted from the figure for brevity but the skilled person will understand that these steps take place prior to the object being determined as malware.

As can be seen, following the determination in the network device query that the object is malicious in S3 the device automatically transmits an update query to a network device to determine whether an update to the anti-virus software stored on the device is available (S10). This query is transmitted regardless of whether or not the minimum time-interval has elapsed. If an update is available then the device automatically downloads the database update (Step S11) and performs a full system scan of the device using the updated anti-virus software (Step S13). If an update is not available then the device performs a full system scan of its file system using the anti-virus database stored on the device (Step S13).

Optionally, the device may only perform a scan of the object and removal of the object in accordance with the updated or locally stored database. The device may request user confirmation that they wish to proceed with a scan of the full file system on the device prior to performing a full scan of its file system (this is illustrated as Step S12).

Preferably, the update query about the availability of an anti-virus software update and the download of the update are two distinct steps. The update query transmitted by the device to a network device to discover whether a new update is available is a lightweight network query. The network device's response is also a lightweight message including either a positive or a negative response. From the response the device can determine whether an update to the anti-virus software stored in its memory is available and therefore whether there may be a need to download an update to that anti-virus software.

Optionally, the device may be configured to transmit the update query to the network device at predetermined time intervals. The response to the query may be cached such that the device, upon scanning an object can automatically determine whether an update has been issued without having to determine whether the minimum time interval has elapsed or transmit an update query to the network device. This provides the advantage that an update query will not need to be made multiple times when scanning multiple objects. Such an embodiment is illustrated in FIG. 4.

Figure 4:
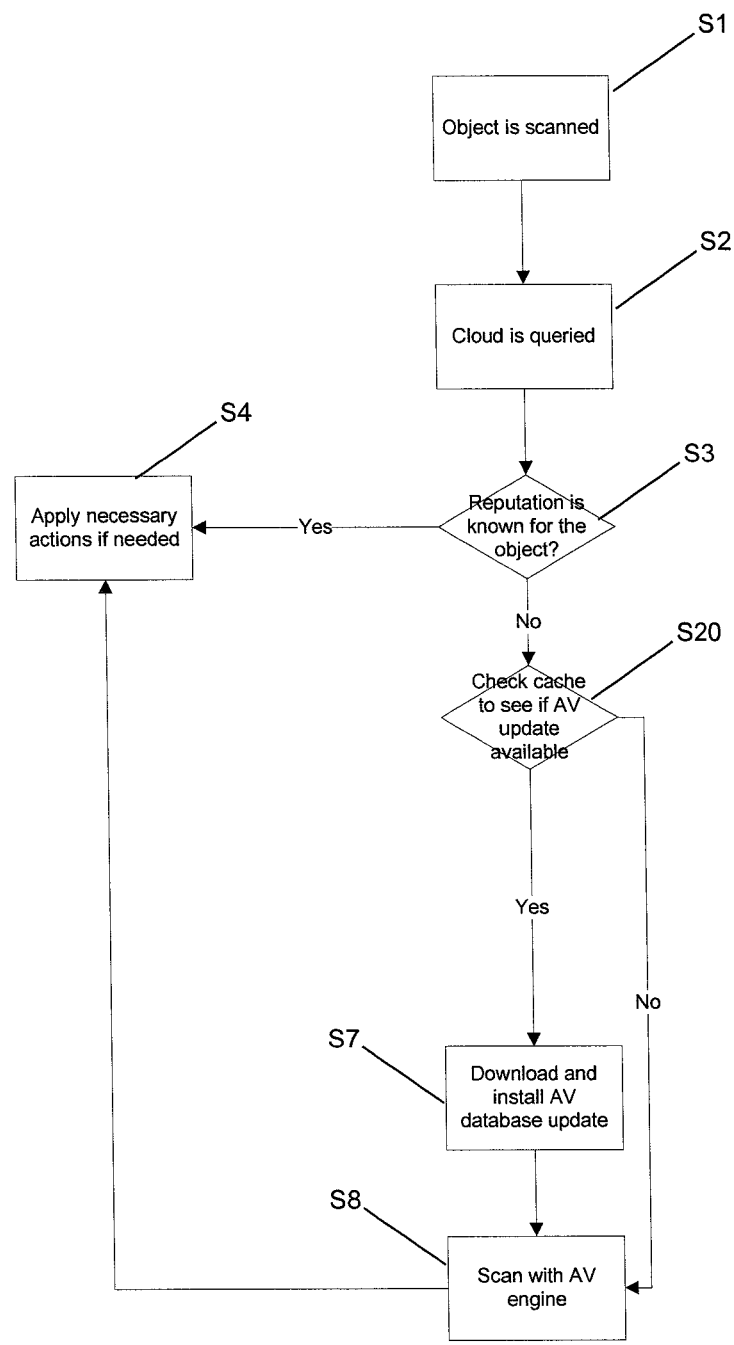
FIG. 4 is a flow diagram of a method of updating anti-virus software on a device according to another embodiment of the present invention.

In FIG. 4 steps S1, to S4 are as described with reference to FIGS. 2 and 3. In the event that the reputation for the object is not known from the object's meta-data then the cache is checked to determine whether or not an update to the anti-virus software stored on the device is available (Step S20). If the cache indicates that an update is available then the device downloads and installs any updates to the anti-virus software (Step S7) and scans the object using the updated anti-virus software stored on the device (Step S8). If no update is available then the device scans the object using the anti-virus software stored on the device (Step S8).

Figure 5:
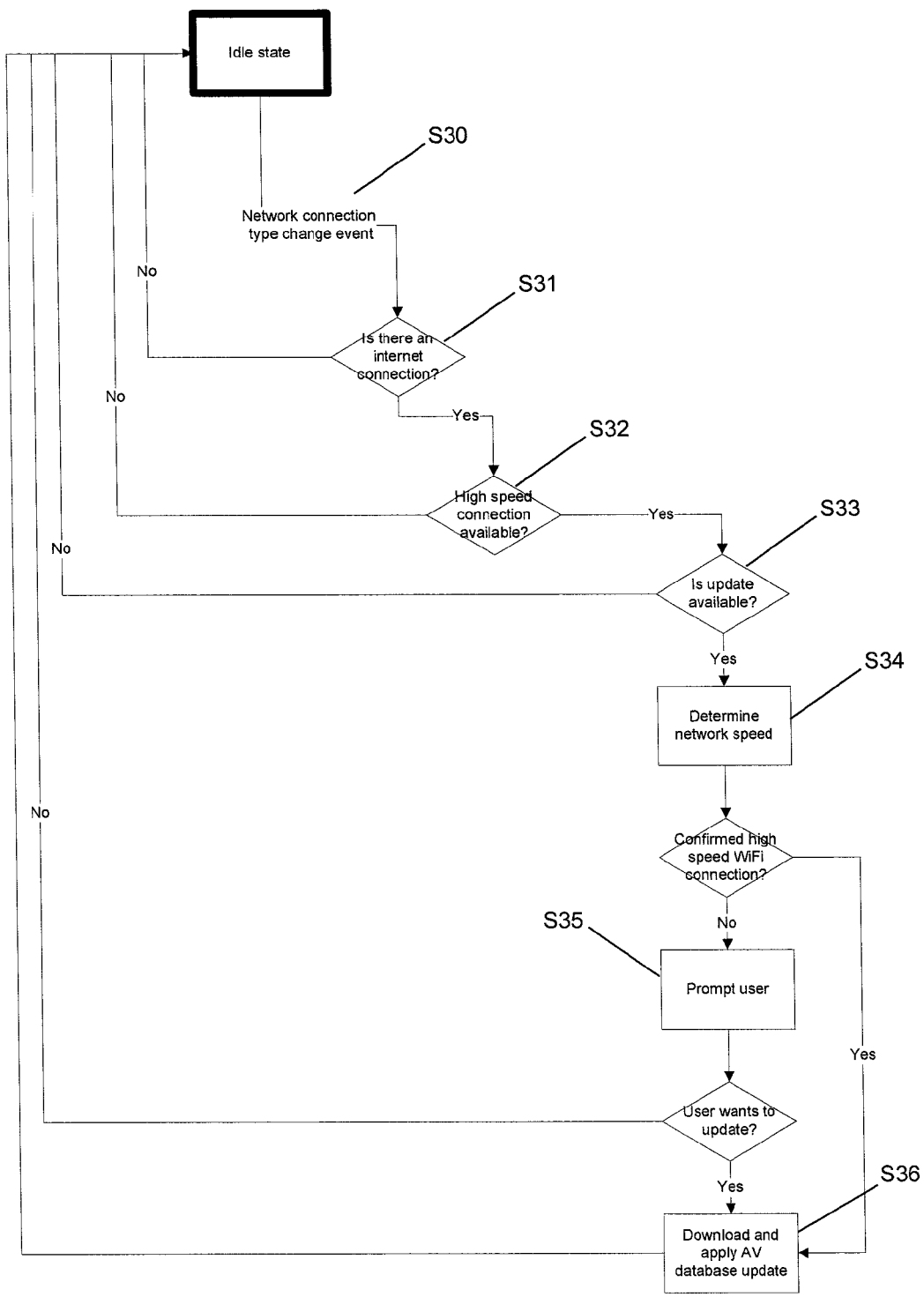
FIG. 5 is a flow diagram of a method of updating anti-virus software on a device according to a further embodiment of the present invention.

It may be desirable to use the response to the update query stored in the cache to determine whether or not to download an update. Many devices are capable of connecting to a network using different types of network connections types, for example, a mobile telephone may utilise a cellular network connection or a wireless connection to a fixed network (e.g. WiFi connection). The different types of networks may have different properties, for example, a WiFi connection is likely to be higher speed than a cellular network connection. FIG. 5 illustrates a method where a device having anti-virus software utilises its ability to connect to the internet using different network connection types to control when to download an anti-virus software update.

In this method the device first determines a change in the device's connection type, for example, the device may determine that a connection to the network through a wireless access point is available (Step S30). Following detection of a change in network connection type the device determines whether or not a connection to the internet is available through the connection (Step S31). If there is no internet connection available through the connection then the device returns to its normal resting state. If an internet connection is available through the connection then the device is configured to determine whether the connection is a high speed connection (Step S32).

If the connection is not a high speed connection then the device returns to its normal resting state. If the connection is a high speed connection then the device queries the cache to determine whether there is an update available for the anti-virus software (Step S33). If no update to the anti-virus software is available the device returns to idle mode.

If there an update to the anti-virus software is available then the actual network speed is determined to ensure that it is above a predetermined threshold (Step S34). This is because the data connection may still be a low bandwidth network connection. For example, a mobile broadband connection will appear the same as a WiFi broadband connection to a mobile phone but will provide a much lower bandwidth connection to the internet than a WiFi broadband connection. As will be understood, if the connection is a low bandwidth network connection then downloading the update may take a long time.

Therefore, if the device determines that the network speed is less than a predetermined speed the user is prompted to confirm that they wish to update the anti-virus software (Step S35). If the user does not wish to update the anti-virus software then the device returns to its normal resting state. If the network speed is greater than a predetermined speed or the user confirms they wish to update the anti-virus software then the update to the anti-virus software is downloaded and installed (Step S36). In this way the anti-virus database may be maintained in the most cost and time-efficient manner.

As will be understood the steps of determining the network speed and prompting the user are merely optional but preferable steps. Optionally, the method may omit the step of determining whether a high speed connection is available and merely determine the speed of the network connection as described with reference to Step S34. In such a method the step of determining the speed of the network connection may take place either before or after determining whether an update is available.

Additionally, rather than having a cache of a response to an update query the device may, upon determining whether there is an internet connection, determine if a minimum time interval has elapsed. If the minimum time interval has not elapsed then the device returns to its idle state, if the minimum time interval has elapsed then the device transmits an update query to the network device. If the response to the update query indicates that that no update is available then the device returns to an idle state. If the response to the update query indicates that an update is available then the device continues to step S34 in FIG. 5.

The method of FIG. 5 has the advantage of enabling updates to anti-virus software to be downloaded over non-cellular network connections thereby preserving any mobile data transfer cap which may apply to the device. It also minimises the number of large downloads of anti-virus software over slow or limited bandwidth connections to the device.

As will be understood by the skilled person the minimum time interval may be any suitable time period. Additionally, the minimum time interval may be automatically or manually set. In the event that the minimum time interval is automatically set it may depend on the device type, for example, a mobile telephone may have one default minimum time interval associated with it and a tablet may have a different default minimum time interval associated with it. The minimum time interval is preferably set in the anti-virus software when it is initially downloaded and installed in the device.

Although the present invention has been described with reference to mobile devices the skilled person will appreciate that the invention is equally applicable to fixed devices such as a desktop personal computer. Additionally, the network device may be any suitable network device. For example, it may be an anti-virus network server present in a cloud based system or other external network.

For the purposes of this application anti-virus software may be taken to mean any data or part of any data used to scan and/or clean one or more objects in a device's file system. Updates to the anti-virus software may be updates downloaded in any suitable format, including diffs, to update all or part of the anti-virus software present on the device. The updates may be, for example, an update to a database of meta-data relating to known malware or known clean objects.

An object may be any data present on the device including, but not limited to, program files.

The invention claimed is:

1. A device comprising:
a memory including anti-virus software,
an output configured to transmit an update query to a second device, the update query requesting information on whether an update to the anti-virus software stored in the memory is available,
an input to receive a response to the update query, the response indicating whether an update to the anti-virus software stored in the memory is available,
a cache configured to cache the response to the query, and
a processor configured to query the cache in response to a trigger and, if the query of the cache indicates an update to the anti-virus software is available causing the device to download an update to the anti-virus software;
wherein the processor is further configured to determine meta-data for an object on the device, and the device further comprises an output to query a second device using the meta-data for the object, the trigger being receiving a response indicating that the object is not known by the second device; and
wherein the device is configured to transmit the update query at predetermined time intervals, the cache being configured to cache the last received response to the query.

2. The device of claim 1 wherein the processor is further configured to determine meta-data for an object on the device and query the anti-virus software stored in the memory using the meta-data, and the trigger is the object not being known from the meta-data in the anti-virus software stored in the memory.

3. The device of claim 1 wherein the trigger is one of an object being downloaded to the device, the device being switched on, receiving a user input and determining an object is malicious.

4. A method, in a first device including anti-virus software, comprising:
the first device transmitting an update query to a second device, the update query requesting information on whether an update to the anti-virus software stored in a memory of the first device is available,
receiving, at the first device, a response to the update query indicating whether an update to the anti-virus software is available,
storing the response to the query in a cache, and
querying the cache in response to a trigger and, if the query of the cache indicates an update to the anti-virus software is available the first device downloading an update to the anti-virus software;
wherein a processor is further configured to determine meta-data for an object on the first device, and the first device further comprises an output to query a second device using the meta-data for the object, the trigger being receiving a response indicating that the object is not known by the second device; and
wherein the first device is configured to transmit the update query at predetermined time intervals, the cache being configured to cache the last received response to the query.

5. A computer program stored on a non-transitory computer readable medium which, when executed on a first device including anti-virus software causes the first device to perform the steps of:
transmitting an update query to a second device, the update query requesting information on whether an update to the anti-virus software stored in a memory of the first device is available,
storing the response to the query in a cache, the response to the update query indicating whether an update to the anti-virus software is available, and
querying the cache in response to a trigger and, if the query of the cache indicates an update to the anti-virus software is available the first device downloading an update to the anti-virus software;
wherein a processor is further configured to determine meta-data for an object on the first device, and the first device further comprises an output to query the second device using the meta-data for the object, the trigger being receiving a response indicating that the object is not known by the second device; and
wherein the first device is configured to transmit the update query at predetermined time intervals, the cache being configured to cache the last received response to the query.

6. A method of scanning an object on a device for malware comprising the steps of: following initiation of a scan on the object and prior to a determination as to whether or not the object contains malware, querying a network device to determine whether an update to anti-virus software stored on the device is available and, if an update is available, downloading and installing the update on the device;
    wherein a cache is configured to cache the response to the query, and
    wherein a processor is configured to query the cache in response to a trigger and, if the query of the cache indicates an update to the anti-virus software is available causing the device to download an update to the anti-virus software;
    wherein the processor is further configured to determine meta-data for an object on the device, and the device further comprises an output to query a second device using the meta-data for the object, a trigger for the query being receiving a response indicating that the object is not known by the second device; and
    wherein the device is configured to transmit the update query at predetermined time intervals, the cache being configured to cache the last received response to the query.

7. The method of claim 6, wherein the scan of the object includes the steps of: determining meta-data for the object, querying a database to determine if the meta-data is known, the step of querying the network device being performed if the meta-data is not known.

8. The method of claim 7 wherein the step of querying a database comprises one of querying a database of meta-data on the device and querying a database of meta-data on a network device remote from the device.

9. A device comprising:
    a memory including anti-virus software,
    a processor to scan an object on the device using the anti-virus software,
    an output configured to transmit an update query during the scan and prior to a determination as to whether or not the object contains malware,
    an input to receive a response to the update query, the response indicating whether an update to the anti-virus software stored in the memory is available, and
    an output to request an update to the anti-virus software if the response indicates that an update to the anti-virus software is available;
    a cache configured to cache the response to the update query, and
    wherein the processor is configured to query the cache in response to a trigger and, if the query of the cache indicates an update to the anti-virus software is available, causing the device to download an update to the anti-virus software;
    wherein the processor is further configured to determine meta-data for the object on the device, and the device further comprises an output to query a second device using the meta-data for the object, a trigger for the query being receiving a response indicating that the object is not known by the second device; and
    wherein the device is configured to transmit the update query at predetermined time intervals, the cache being configured to cache the last received response to the query.

10. A computer program stored on a non-transitory computer readable medium which, when executed on a device including anti-virus software causes the device to: scan an object on the device using the anti-virus software, transmit an update query during the scan and prior to a determination as to whether or not the object contains malware, and, upon receiving a response to the update query indicating that an update to the anti-virus software is available, request an update to the anti-virus software if the response indicates that an update to the anti-virus software is available;
    wherein a cache is configured to cache the response to the update query, and
    wherein a processor is configured to query the cache in response to a trigger and, if the query of the cache indicates an update to the anti-virus software is available, the software causes the device to download an update to the anti-virus software;
    wherein the processor is further configured to determine meta-data for the object on the device, and the device further comprises an output to query a second device using the meta-data for the object, a trigger for the query being receiving a response indicating that the object is not known by the second device; and
    wherein the device is configured to transmit the update query at predetermined time intervals, the cache being configured to cache the last received response to the query.

11. A method of updating anti-virus software stored on a device, the device being configured to connect to a network comprising the steps of:
    determining a change in a connection to the network at the device,
    in response to determining a change in the connection, determining if an update to the anti-virus software on the device is available, and
    downloading an update to the anti-virus software to the device over the connection if an update to the anti-virus software is available;
    caching a response to a query, and
    querying the cached response, via a processor, in response to a trigger and, if the query of the cache indicates an update to the anti-virus software is available, causing the device to download an update to the anti-virus software;
    wherein the processor is further configured to determine meta-data for an object on the device, and the device further comprises an output to query a second device using the meta-data for the object, a trigger or the query being receiving a response indicating that the object is not known by the second device; and
    wherein the device is configured to transmit the update query at predetermined time intervals, the cache being configured to cache the last received response to the query.

12. The method of claim 11 further comprising, following determining a change in a connection to the network: determining if the connection is a connection to the internet and wherein the step of downloading an update to the anti-virus software to the device occurs if an update to the anti-virus software is available and the connection is to the Internet.

13. The method of claim 11 further comprising determining the speed of the connection and, if the speed is less than a predetermined threshold providing a prompt to the user of the device wherein the step of downloading an update to the anti-virus software is dependent upon a response to the prompt.

14. The method of claim 11 wherein the step of determining if an update to the anti-virus software on the device is available comprises querying a cache on the device, the cache including an indication of whether an update is available.

15. The method of claim 11 wherein the step of determining if an update to the anti-virus software is available comprises transmitting a query to a network device and receiving a response from the network device indicating whether an update to the anti-virus software is available.

16. A device comprising:
- a transceiver configured to connect to a network over a network connection,
- a memory including anti-virus software, and
- a processor configured to detect a change in the network connection and in response determine whether an update to the anti-virus software is available, and transmit a request for an update to the anti-virus software if it is determined that an update to the anti-virus software is available;
- a cache configured to cache a response to a query, and
- wherein the processor is configured to query the cache in response to a trigger and, if the query of the cache indicates an update to the anti-virus software is available, causing the device to download an update to the anti-virus software;
- wherein the processor is further configured to determine meta-data for an object on the device, and the device further comprises an output to query a second device using the meta-data for the object, a trigger for the query being receiving a response indicating that the object is not known by the second device; and
- wherein the device is configured to transmit the update query at predetermined time intervals, the cache being configured to cache the last received response to the query.

17. A computer program stored on a non-transitory computer readable medium which, when executed on a device including anti-virus software causes the device to: upon determining a change in a network connection at the device, determine if an update to the anti-virus software is available, and, if an update to the anti-virus software is available, cause the device to request an update to the anti-virus software;
- wherein a cache is configured to cache the response to a query, and a processor is configured to query the cache in response to a trigger and, if the query of the cache indicates an update to the anti-virus software is available, the device is caused to download an update to the anti-virus software;
- wherein the processor is further configured to determine meta-data for an object on the device, and the device further comprises an output to query a second device using the meta-data for the object, a trigger for the query being receiving a response indicating that the object is not known by the second device; and
- wherein the device is configured to transmit the update query at predetermined time intervals, the cache being configured to cache the last received response to the query.

* * * * *